US009434280B2

(12) United States Patent
Keller et al.

(10) Patent No.: US 9,434,280 B2
(45) Date of Patent: Sep. 6, 2016

(54) ENERGY-ABSORBING SEAT ASSEMBLY

(71) Applicant: FISHER & COMPANY, INCORPORATED, St. Clair Shores, MI (US)

(72) Inventors: Tobias Keller, Grosse Pointe Woods, MI (US); Walton H. Shurtleff, Brighton, MI (US)

(73) Assignee: FISHER & COMPANY, INCORPORATED, St. Clair Shores, MI (US)

( * ) Notice: Subject to any disclaimer, the term of this patent is extended or adjusted under 35 U.S.C. 154(b) by 62 days.

(21) Appl. No.: 14/567,305

(22) Filed: Dec. 11, 2014

(65) Prior Publication Data

US 2015/0158401 A1  Jun. 11, 2015

Related U.S. Application Data

(60) Provisional application No. 61/914,589, filed on Dec. 11, 2013.

(51) Int. Cl.
*B60N 2/42* (2006.01)
*B60N 2/24* (2006.01)
*B60N 2/427* (2006.01)

(52) U.S. Cl.
CPC ............ *B60N 2/4221* (2013.01); *B60N 2/24* (2013.01); *B60N 2/4242* (2013.01); *B60N 2/42736* (2013.01)

(58) Field of Classification Search
CPC ............ B60N 2/4242; B60N 3/42376; B60N 2/4221
USPC .................... 297/216.19, 216.17, 216.1
See application file for complete search history.

(56) References Cited

U.S. PATENT DOCUMENTS

| | | | | |
|---|---|---|---|---|
| 6,641,214 B2 * | 11/2003 | Veneruso | ............. | B60N 2/0232 297/216.15 |
| 7,510,240 B2 * | 3/2009 | Jones | ............. | B60N 2/502 297/216.17 |
| 8,579,371 B2 * | 11/2013 | Masutani | ............. | B60N 2/4221 297/216.16 |
| 8,641,141 B2 * | 2/2014 | Hassler | ............. | B60N 2/0705 297/216.1 |
| 8,714,642 B2 * | 5/2014 | Lamparter | ............. | B60N 2/24 297/216.1 |
| 8,794,402 B2 * | 8/2014 | Ruan | ............. | B60N 2/24 188/280 |
| 8,998,325 B2 * | 4/2015 | Jonsson | ............. | B60N 2/42727 297/216.15 |
| 2007/0034768 A1 * | 2/2007 | Stenard | ............. | B60N 2/4242 248/562 |
| 2010/0019555 A1 * | 1/2010 | Feng | ............. | B60N 2/4221 297/216.19 |
| 2015/0300785 A1 * | 10/2015 | Lamparter | ............. | F41H 7/046 297/216.17 |

* cited by examiner

*Primary Examiner* — Laurie K Cranmer
(74) *Attorney, Agent, or Firm* — Harness, Dickey & Pierce, P.L.C.

(57) ABSTRACT

A seat assembly can include a base, a linkage assembly, a seat, and an energy-management assembly. The linkage assembly can be supported by the base and include a return plate supported by the base for rotation about a first axis of rotation. The seat can be supported by the linkage assembly for movement relative to the base along a generally arcuate path. The return plate can be operable to rotate relative to the seat about a second axis of rotation. The energy-management assembly can be supported by the base for rotation about a third axis of rotation and supported by the return plate for rotation about a fourth axis of rotation. The energy-management assembly can include a biasing member configured to resist the movement of the seat relative to the base along the generally arcuate path.

9 Claims, 15 Drawing Sheets

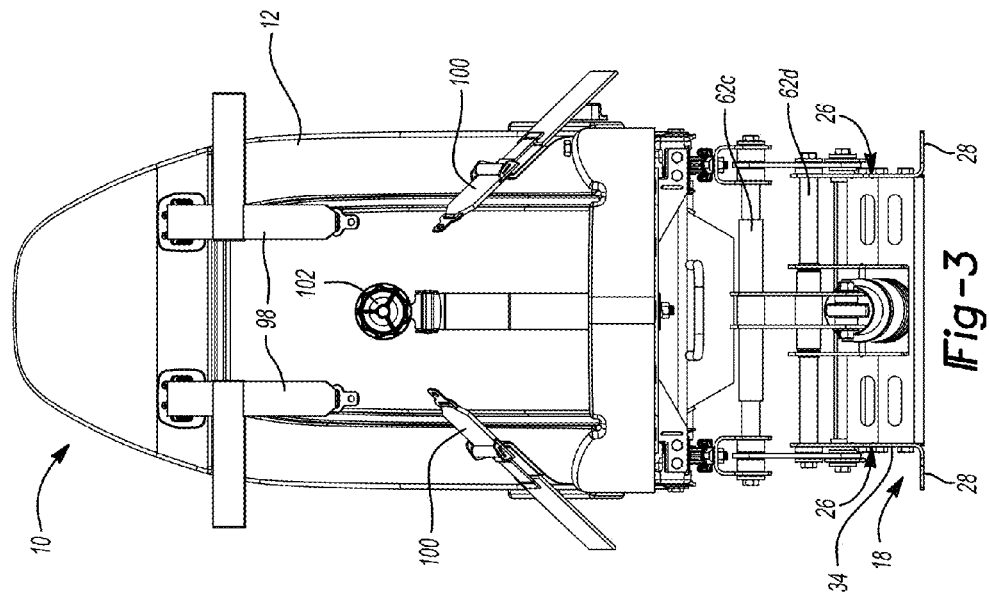
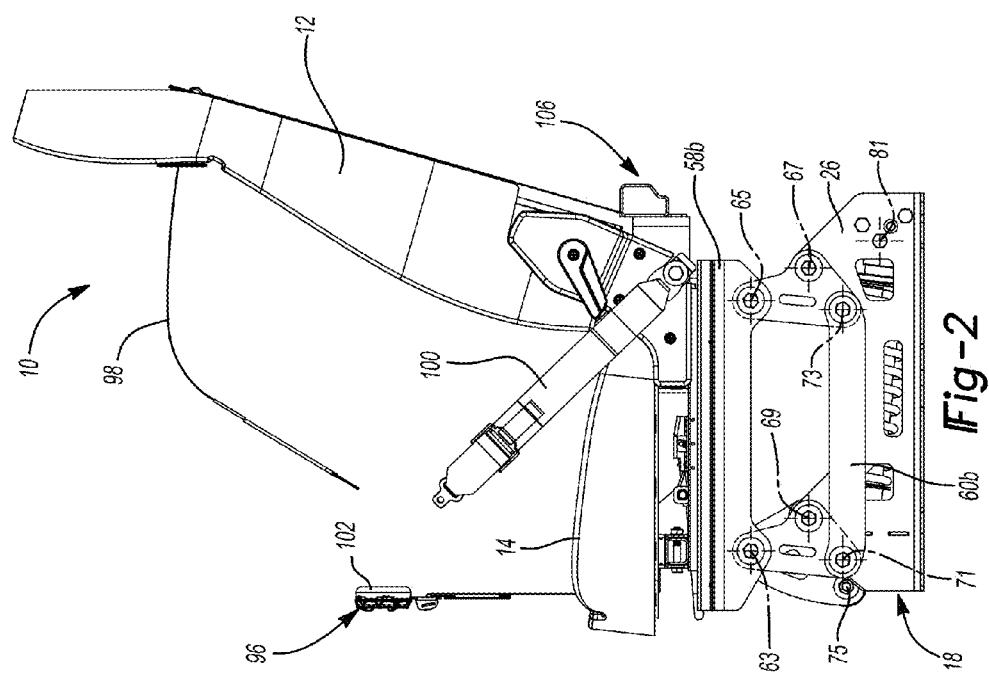

ENERGY-ABSORBING SEAT ASSEMBLY

CROSS-REFERENCE TO RELATED APPLICATIONS

This application claims the benefit of U.S. Provisional Application No. 61/914,589, filed on Dec. 11, 2014. The entire disclosure of the above application is incorporated herein by reference.

FIELD

The present disclosure relates to seat assemblies, and more specifically to an energy-absorbing seat assembly.

BACKGROUND

This section provides background information related to the present disclosure and is not necessarily prior art.

When a moving vehicle is abruptly stopped (i.e., from contact with a stationary object or another vehicle), the forward momentum and associated forces are transferred to vehicle occupants. Vehicle safety systems—including seating systems—minimize the effects of such forces on the vehicle occupants by transferring energy generated by the vehicle impact to the structure of the vehicle and away from the vehicle occupants.

Impact forces are commonly absorbed by the vehicle structure through deformation of steel and other structural components. Forces associated with an occupant moving relative to the vehicle are safely and controllably transmitted to the vehicle structure via the seatbelt or airbag such that the structure, as opposed to the occupant, can manage the energy.

Energy management devices are commonly designed for use in conjunction with one another to transfer impact forces to the associated vehicle structure. For example, airbags transmit a force received by a moving occupant to the vehicle structure via a steering column or cross-car beam, while seatbelts transmit similar forces to the vehicle structure via a vehicle floor pan and/or vehicle seat. Such vehicle seats receive the impact force from one, or both of, the airbag and seatbelt to dissipate energy safely to the vehicle structure, thereby protecting the vehicle occupants. Thus, interaction between the occupant and the seat back plays a role in energy management during an impact event.

The foregoing safety systems adequately protect an occupant during a front or rear impact event. However, such systems are not designed to absorb forces applied to an underbody of a vehicle. Such forces applied to an underbody of a vehicle may be the result of improvised explosive devices, or so-called IEDs, used in combat zones to destroy armored personnel carriers. Such forces often cause the vehicle to move in a direction away from the ground, potentially causing injury to vehicle occupants caused by the initial impact of the force, as well as the return of the vehicle to the ground when the force is dissipated.

SUMMARY

This section provides a general summary of the disclosure, and is not a comprehensive disclosure of its full scope or all of its features.

The present disclosure provides a seat assembly. The seat assembly can include a base, a linkage assembly, a seat, and an energy-management assembly. The linkage assembly can be supported by the base and include a return plate supported by the base for rotation about a first axis of rotation. The seat can be supported by the linkage assembly for movement relative to the base along a generally arcuate path. The return plate can be operable to rotate relative to the seat about a second axis of rotation. The energy-management assembly can be supported by the base for rotation about a third axis of rotation and supported by the return plate for rotation about a fourth axis of rotation. The energy-management assembly can include a biasing member configured to resist the movement of the seat relative to the base along the generally arcuate path.

In some configurations, the energy-management assembly may be configured to resist the rotation of the linkage assembly when the seat assembly is in a first configuration In some configurations, the energy-management assembly may be configured to produce a biasing torque about the first and second axes of rotation.

In some configurations, the energy-management assembly can include a damper.

In some configurations, the seat may be operable to follow a generally arcuate path between a first configuration and a second configuration.

In some configurations, the seat may be non-rotatable relative to the base.

In some configurations, the linkage assembly may further comprise a first rocking member supported by the base for rotation about the first axis of rotation. The first rocking member may be supported by the return plate for rotation about the second axis of rotation.

In some configurations, the linkage assembly may further comprise a second rocking member supported by the base for rotation about a fifth axis of rotation.

In some configurations, the seat may be operable to rotate relative to the second rocking member about a sixth axis of rotation.

In some configurations, the seat assembly may include a seat back and a seat belt system. The seat back may include a seat belt aperture. The seat belt system may include a strap member extending through the seat belt aperture.

In other variations, the present disclosure provides a seat assembly. The seat assembly may include a base, a linkage assembly, a seat, and an energy-management assembly. The linkage assembly may be supported by the base for rotation about a first axis of rotation. The seat may be supported by the linkage assembly for rotation about a second axis of rotation. The energy-management assembly may be supported by the base for rotation about a third axis of rotation. The energy-management assembly may include an energy-absorption device operable to produce a torque about the first axis of rotation Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a side view of the seat assembly of FIG. 1;

FIG. 3 is a front view of the seat assembly of FIG. 1;

Corresponding reference numerals indicate corresponding parts throughout the several views of the drawings.

DETAILED DESCRIPTION

Figure 1:
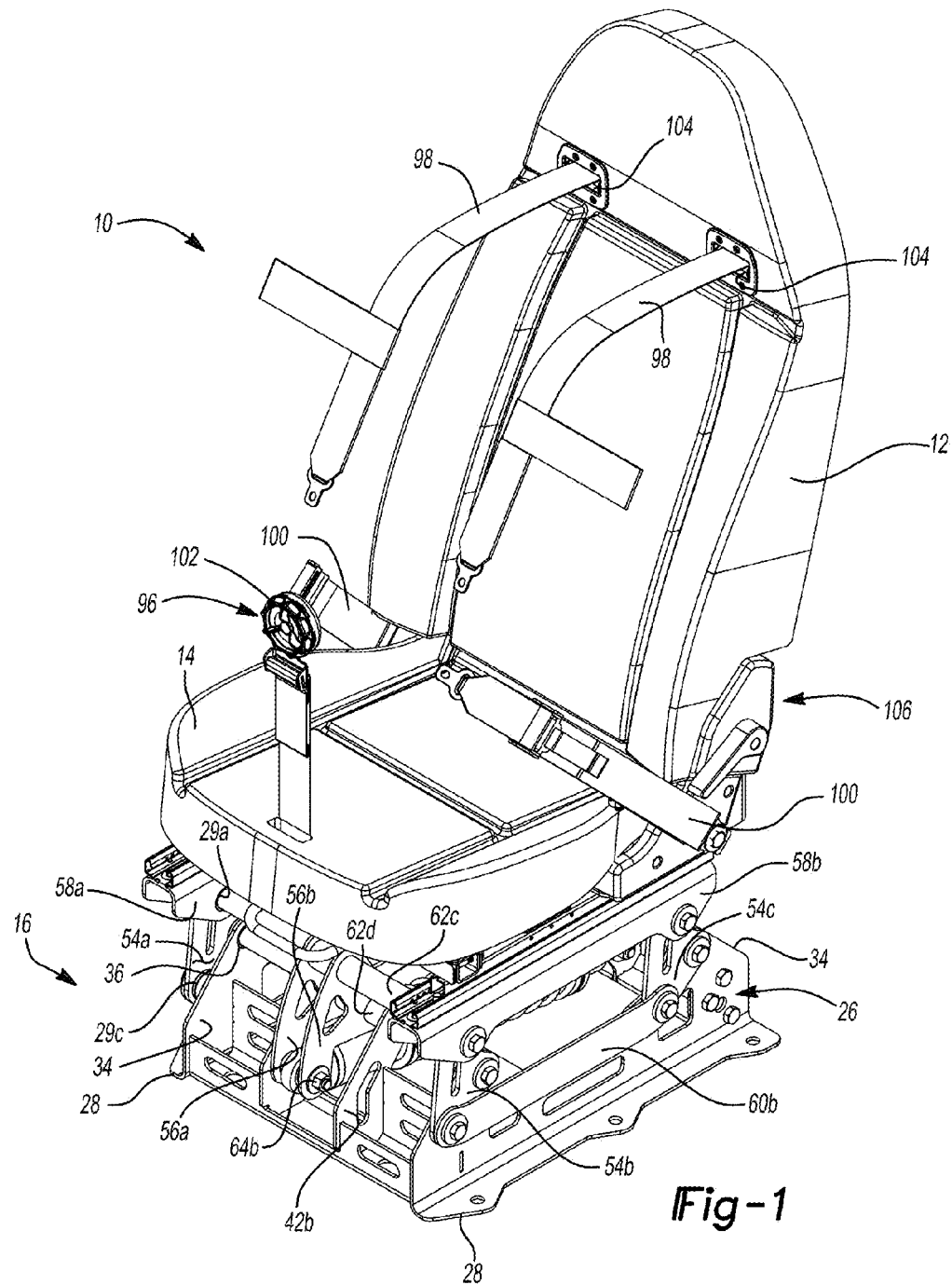
FIG. 1 is a perspective view of a seat assembly in accordance with the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a seat assembly 10 is provided. The seat assembly 10 may include a seat back 12, a seat bottom 14, and a support assembly 16. The seat bottom 14 may pivotably support the seat back 12 such that an angle of the seat back 12 may be selectively adjusted relative to the seat bottom 14.

Figure 4:
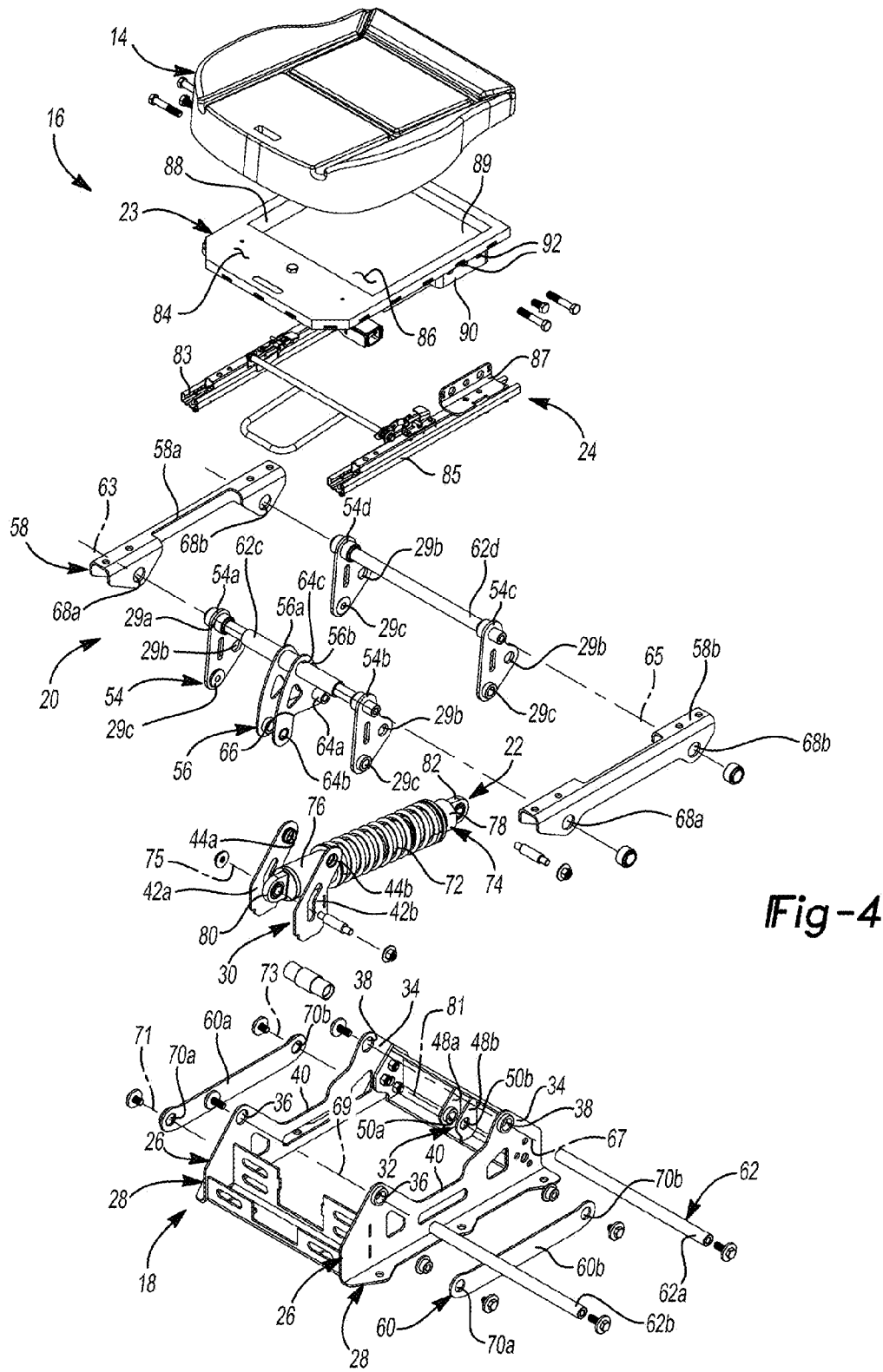
FIG. 4 is an exploded view of a portion of the seat assembly of FIG. 1.

As illustrated in FIG. 4, the support assembly 16 may generally include a base 18, a linkage assembly 20, an energy-management assembly 22, a pan 23, and an adjustment assembly 24. The base 18 may be secured to a vehicle (not shown), and may rotatably support the linkage assembly 20 and the energy-management assembly 22 relative to the vehicle via a plurality of apertures, hubs, or similar rotatable mounting features, and a corresponding plurality of screws, bolts, pins, or similar attachment features known in the art.

Figure 18:
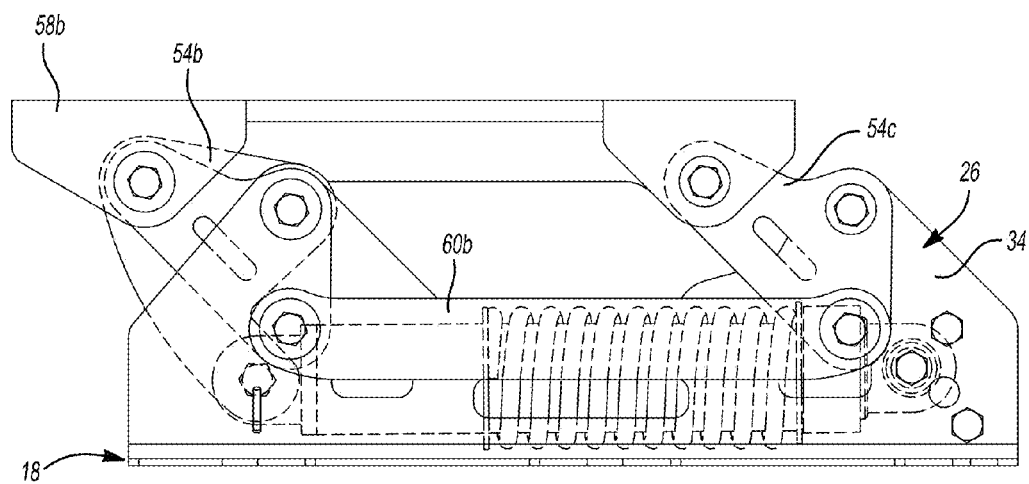
FIG. 18 is a side view of the support structure of FIG. 16, shown in the second configuration.
Figure 19:
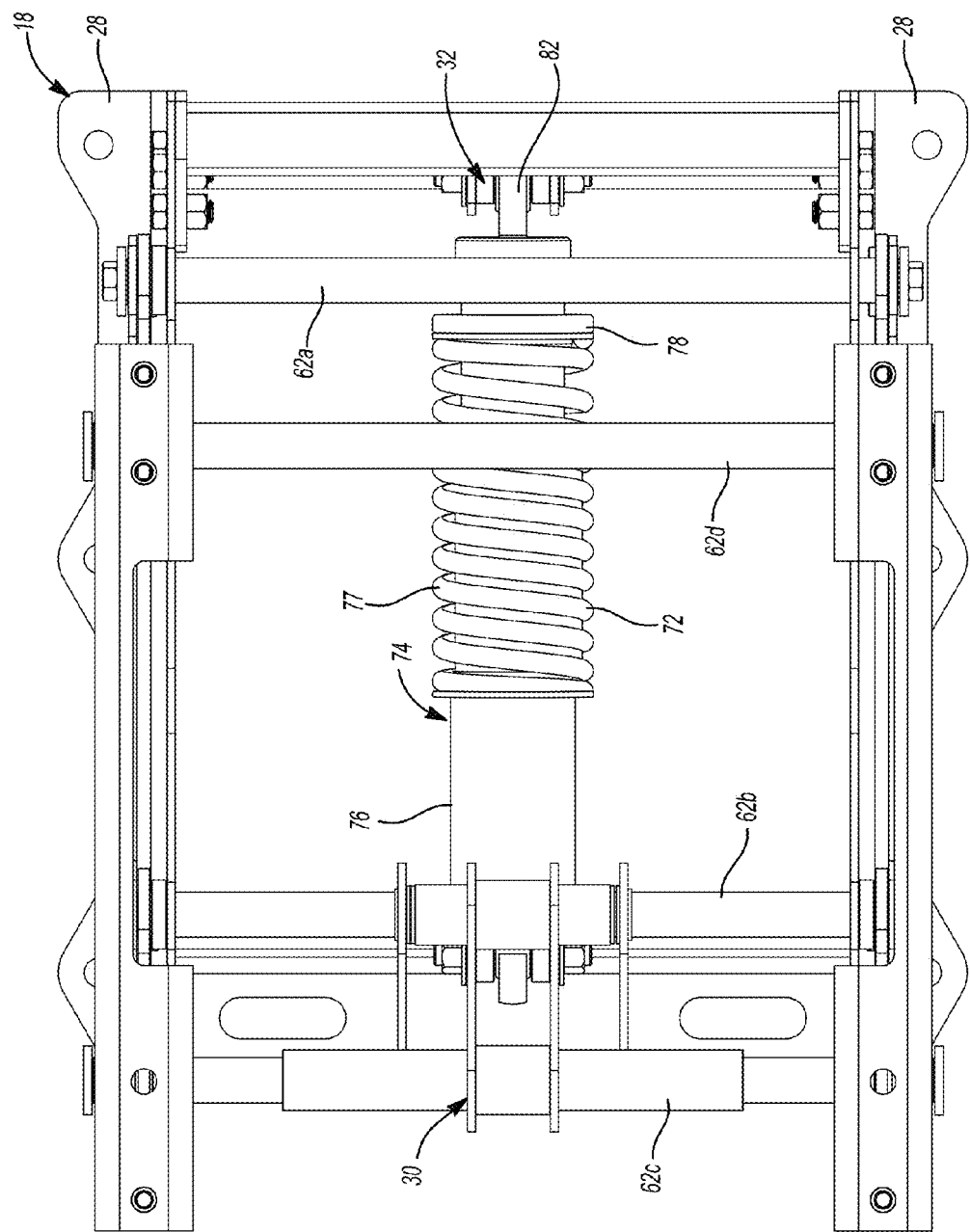
FIG. 19 is a bottom view of the support structure of FIG. 16, shown in the second configuration.

The base 18 may include side walls 26, a first support bracket 30, and a second support bracket 32. With reference to at least FIG. 5, the side walls 26 may include a lateral portion 28 and a vertical portion 34. The lateral portion 28 may be mounted to the vehicle (not shown) and may be integrally formed with the vertical portion 34. The vertical portion 34 may include first and second mounting features 36, 38 for rotatably attaching the base 18 to the linkage assembly 20. The height of the vertical portion 34 may be greater at the location of the first and second mounting features 36, 38 than at a recessed location 40 therebetween. As will be discussed in more detail below, and with reference to FIG. 18, the recessed location 40 may accept a portion of the linkage assembly 20 when the seat assembly 10 is in a second configuration, thereby allowing the seat assembly 10 to assume the second configuration.

The first support bracket 30 may be attached to the side walls 26 and may include substantially parallel and opposing first and second support members 42a, 42b. The first and second support members 42a, 42b may be substantially parallel to the vertical portion 34 of the side walls 26 and may further include first and second mounting features 44a, 44b for rotatably attaching the base 18 to the linkage assembly 20.

The second support bracket 32 may be attached to the side walls 26 and may include substantially parallel and opposing third and fourth support members 48a, 48b. The third and fourth support members 48a, 48b may be substantially parallel to the vertical portion 34 of the side walls 26 and may further include first and second mounting features 50a, 50b for rotatably attaching the base 18 to the energy-management assembly 22.

Figure 5:
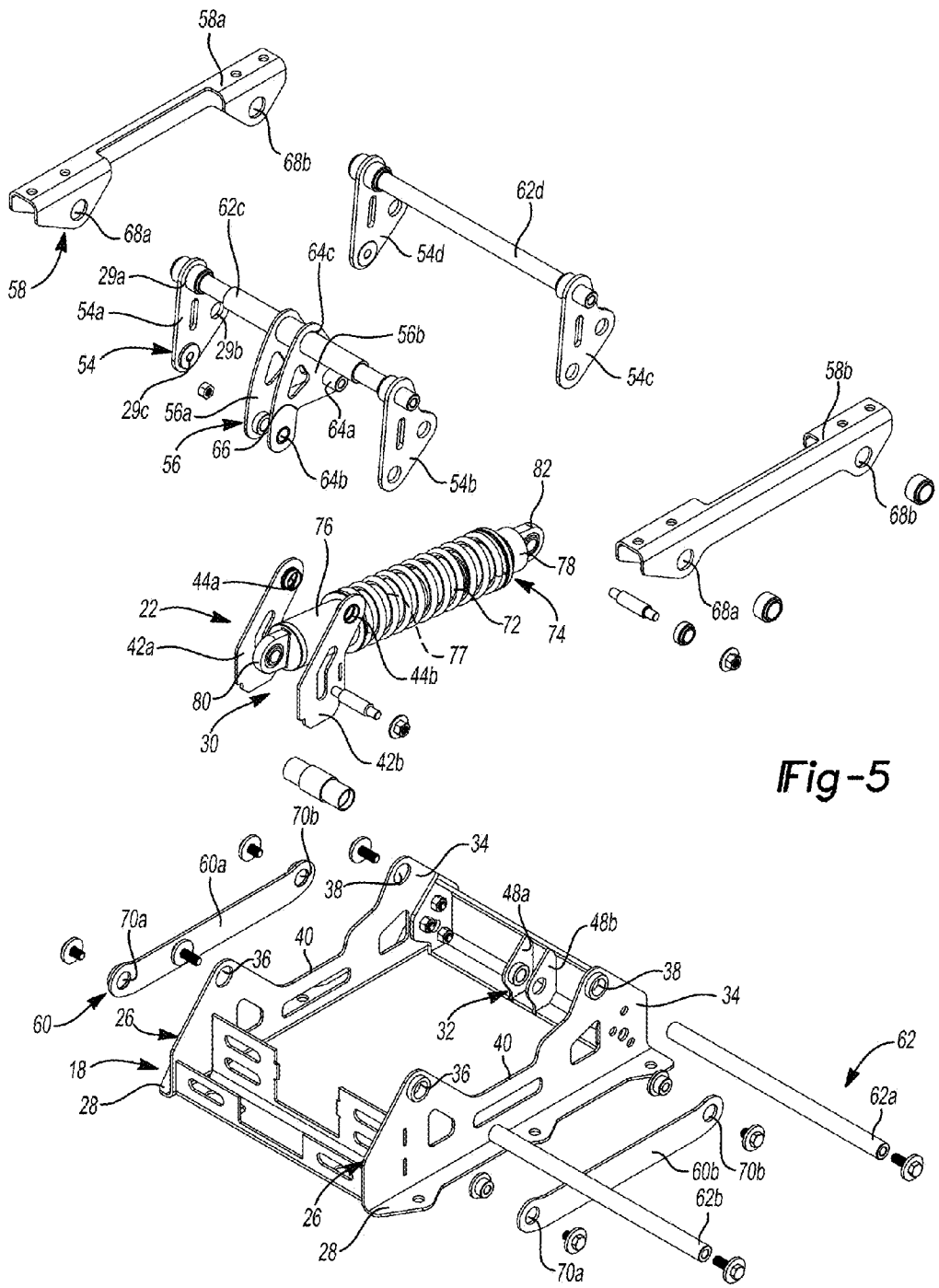
FIG. 5 is an exploded view of a support structure of the seat assembly of FIG. 1.

With continued reference to at least FIG. 5, the linkage assembly 20 may include a rocking member 54, a return plate 56, a support member 58, a connecting plate 60, and a rod member 62. In some configurations, the linkage assembly 20 may include substantially identical first, second, third, and fourth rocking members 54a, 54b, 54c, 54d, substantially identical first and second return plates 56a, 56b, substantially identical first and second support members 58a, 58b, substantially identical first and second connecting plates 60a, 60b, and substantially identical first, second, third and fourth rod members 62a, 62b, 62c, 62d. Accordingly, the description herein will reference the representative rocking member 54, return plate 56, support member 58, connecting plate 60, and rod member 62, when appropriate.

The rocking member 54, return plate 56, support member 58, and connecting plate 60 may be rotatably assembled, and attached to the base 18, via a plurality of apertures, hubs, or similar mounting features, and a corresponding plurality of screws, bolts, pins, or similar attachment features known in the art.

The rocking member 54 may be generally triangular-shaped and may include a first mounting feature 29a, a second mounting feature 29b and a third mounting feature 29c disposed at respective corners thereof. As illustrated in FIG. 4, the first mounting feature 29a may be rotatably attached to the third or fourth rod member 62c, 62d for rotation about a first and second axis of rotation 63, 65, respectively. The second axis of rotation 65 may be substantially parallel to the first axis of rotation 63. The second mounting feature 29b may be rotatably attached to the first or second rod member 62a, 62b for rotation about a third and fourth axis of rotation 67, 69, respectively. The third and fourth axes of rotation 67, 69 may be substantially parallel to the first and second axes of rotation 63, 65, respectively. The third mounting feature 29c may be rotatably attached to the connecting plate 60 for rotation about a fifth axis of rotation 71 and a sixth axis of rotation 73. The fifth and sixth axes of rotation 71, 73 may be substantially parallel to the first, second, third and fourth axes of rotation 63, 65, 67, 69. Accordingly, and as will be explained in more detail below, the first, second and third mounting features 29a, 29b, 29c allow the rocking members 54a, 54b, 54c, 54d to rotate with respect to the base 18 and the seat bottom 14.

With further reference to FIG. 4, the return plate 56 may be generally triangular-shaped and may include a first mounting feature 64a, a second mounting feature 64b and a third mounting feature 64c disposed at respective corners thereof. The return plate 56 may also include a generally V-shaped notched portion 66 extending between the first mounting feature 64a and the second mounting feature 64b. The notched portion 66 may accept the energy-management assembly 22 when the seat assembly 10 is in a first configuration (FIG. 6), and thereby prevent contact and interference between the return plate 56 and the energy-management assembly 22. The first mounting feature 64a may be rotatably attached to the second rod member 62a for rotation about the fourth axis of rotation 69. The second mounting feature 64b may be rotatably attached to the energy management assembly 22 for rotation about a seventh axis of rotation 75. The seventh axis of rotation 75 may be substantially parallel to the first, second, third, fourth, fifth and sixth axes of rotation 63, 65, 67, 69, 71, 73. The third mounting feature 64c may be rotatably attached to the third rod member 62c for rotation about the first axis of rotation 63.

The support member 58 may include a first mounting feature 68a and a second mounting feature 68b disposed at opposite ends thereof. The first mounting feature 68a may be rotatably attached to the third rod member 62c for rotation about the first axis of rotation 63. The second mounting feature 68b may be rotatably attached to the fourth rod member 62d for rotation about the second axis of rotation 65.

The support member 58 may have a substantially U-shaped cross-section extending along the length thereof and may generally provide lateral support between the first rocking member 54a and the fourth rocking member 54d. Similarly, the second support member 58b may generally provide lateral support between the second rocking member 54b and the third rocking member 54c. The lateral support provided by the first support member 58a and the second support member 58b ensures smooth, rotatable operation of the linkage assembly 20, during operation thereof. The first and second support members 58a, and 58b may also support the seat bottom 14 in a direction substantially perpendicular to the first, second, third, fourth, fifth, sixth and seventh axes of rotation 63, 65, 67, 69, 71, 73, 75.

The connecting plate 60 may include a first mounting feature 70a and a second mounting feature 70b disposed at respective ends thereof. The first mounting feature 70a may be rotatably attached to the first rocking member 54a or to the second rocking member 54b for rotation about the fifth axis of rotation 71. The second mounting feature 70b may be rotatably attached to the third rocking member 54c or to the fourth rocking member 54d for rotation about the sixth axis of rotation 73. The first connecting plate 60a may generally cooperate with the first support member 58a to provide lateral support between the first rocking member 54a and the fourth rocking member 54d, and to provide lateral support between the second rocking member 54b and the third rocking member 54c, to ensure smooth, rotatable operation of the linkage assembly 20.

As further illustrated in at least FIG. 4, the energy-management assembly 22 may include a biasing member 72 and a piston assembly 74. The biasing member 72 may be a coil spring that surrounds at least a portion of an outer surface 77 of the piston assembly 74. The piston assembly 74 may include an inner cylinder 76, an outer cylinder 78, a damper mechanism (not shown), a first mounting feature 80, and a second mounting feature 82. The inner cylinder 76 may be concentrically and slidably mounted to the outer cylinder 78 with the damper mechanism and biasing member 72 mounted therebetween.

Figure 6:
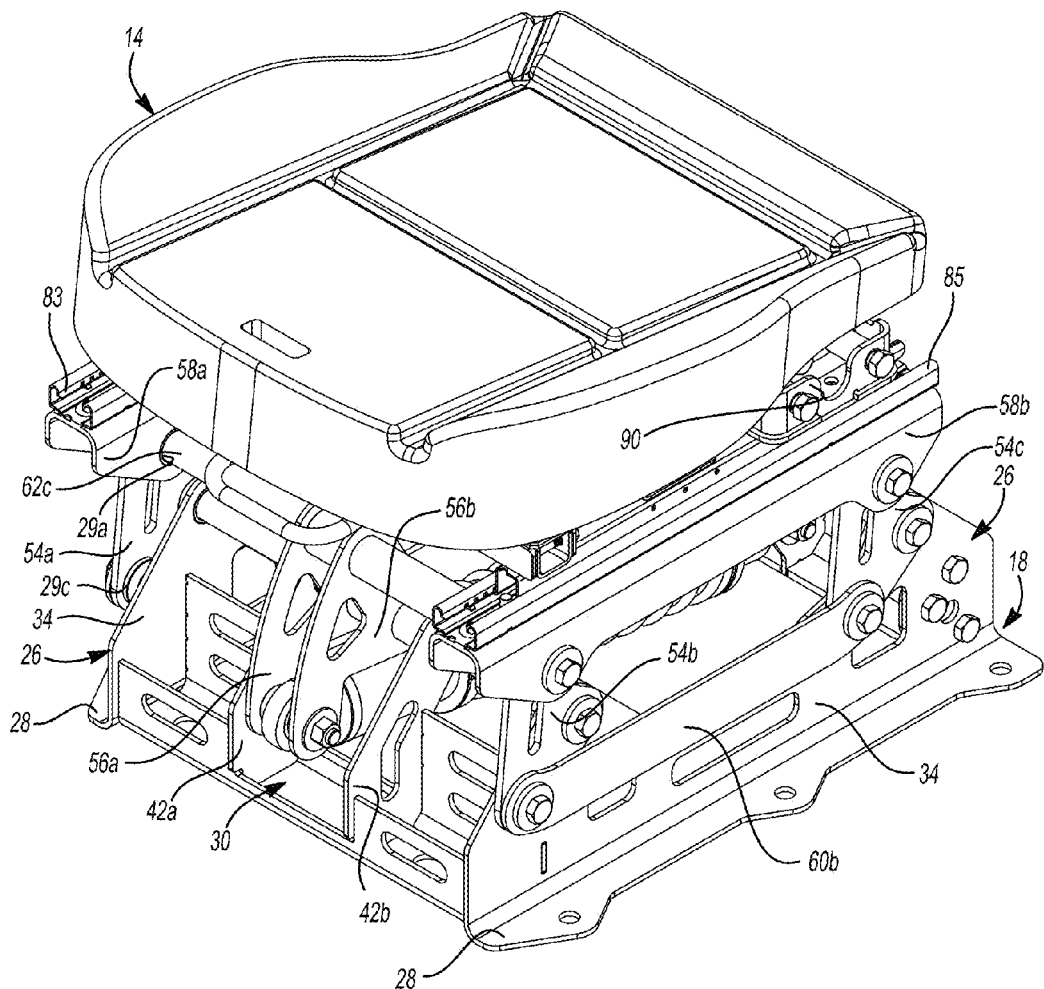
FIG. 6 is a perspective view of a portion of the seat assembly of FIG. 1, shown in a first configuration.
Figure 7:
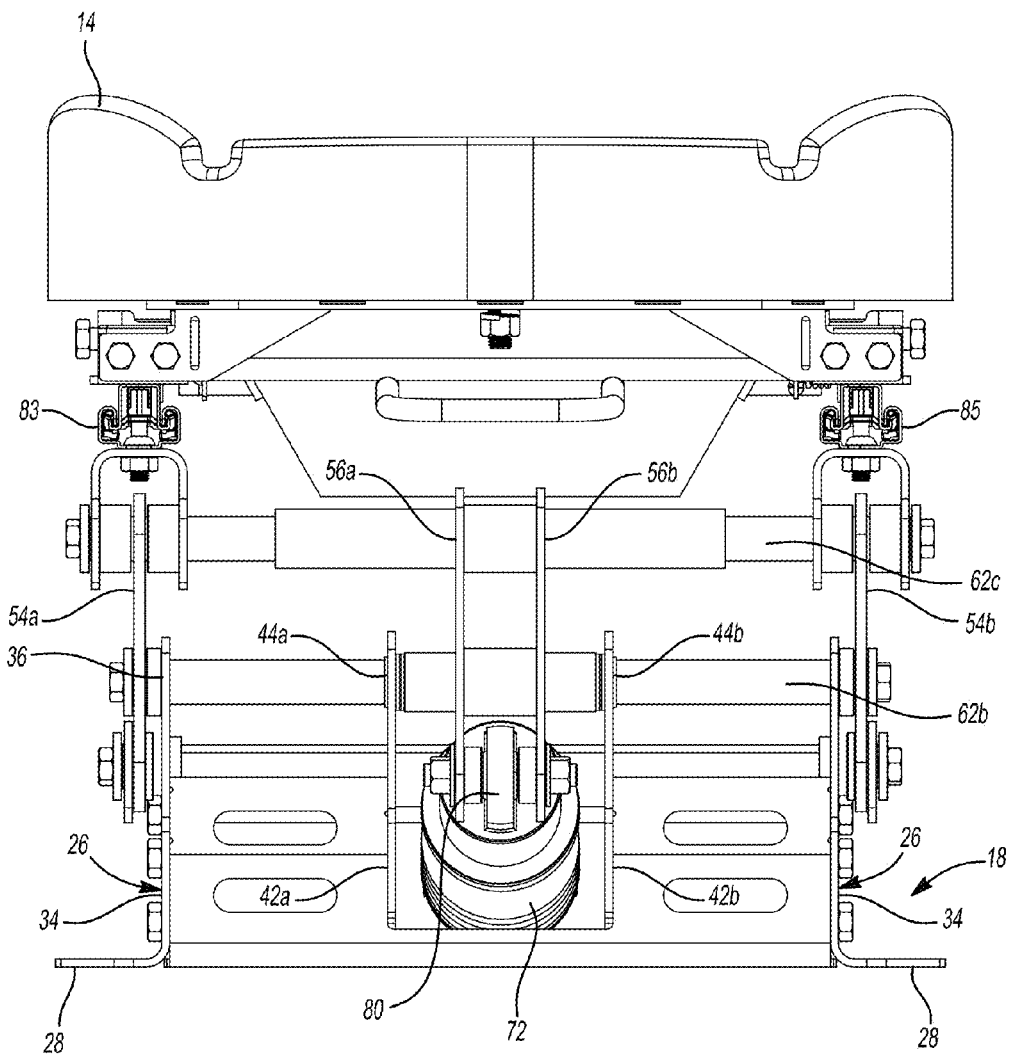
FIG. 7 is a front view of the portion of the seat assembly shown in FIG. 6, shown in the first configuration.
Figure 8:
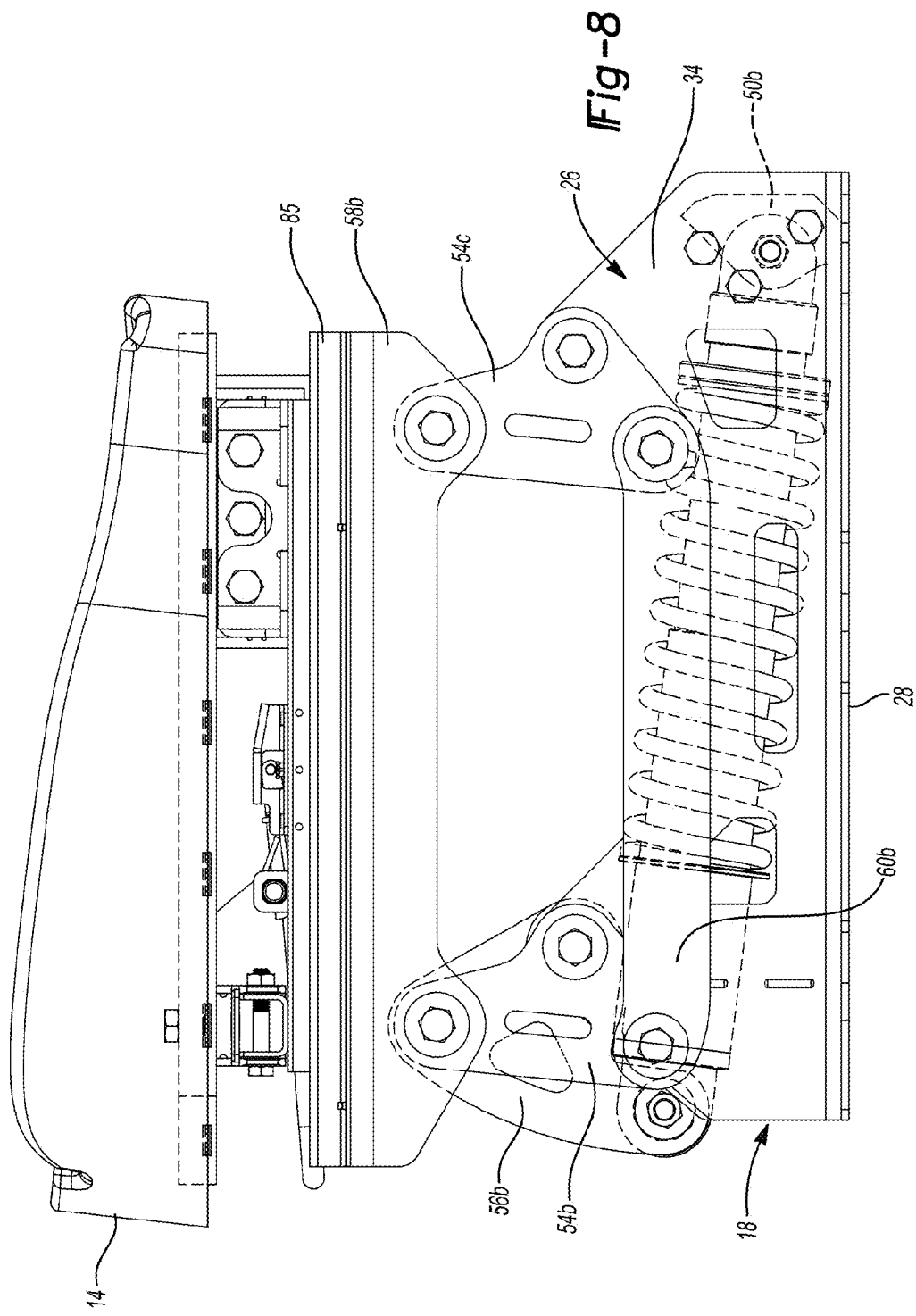
FIG. 8 is a side view of the portion of the seat assembly shown in FIG. 6, shown in the first configuration.
Figure 9:
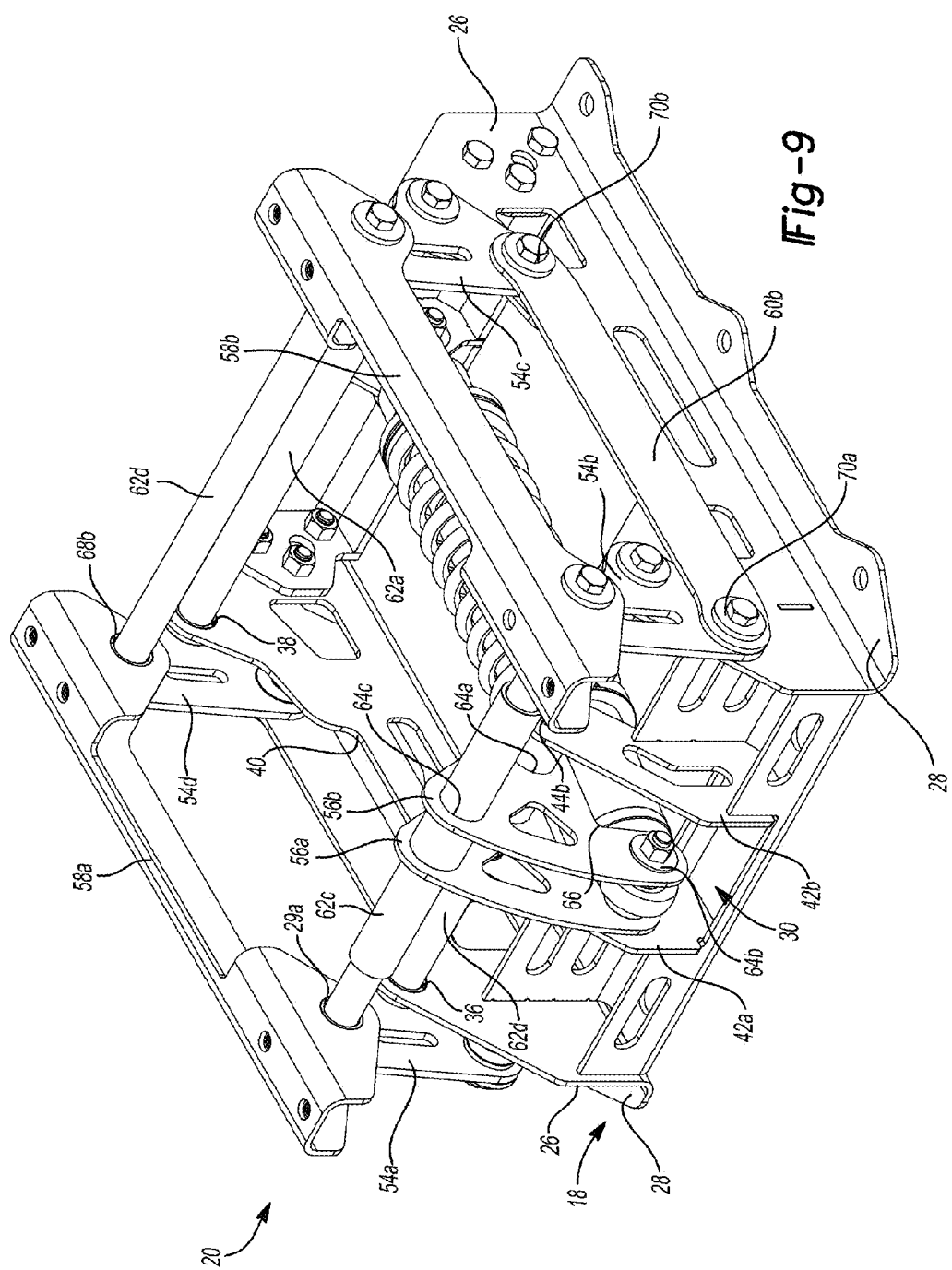
FIG. 9 is a perspective view of the support structure of the seat assembly of FIG. 1, shown in the first configuration.
Figure 10:
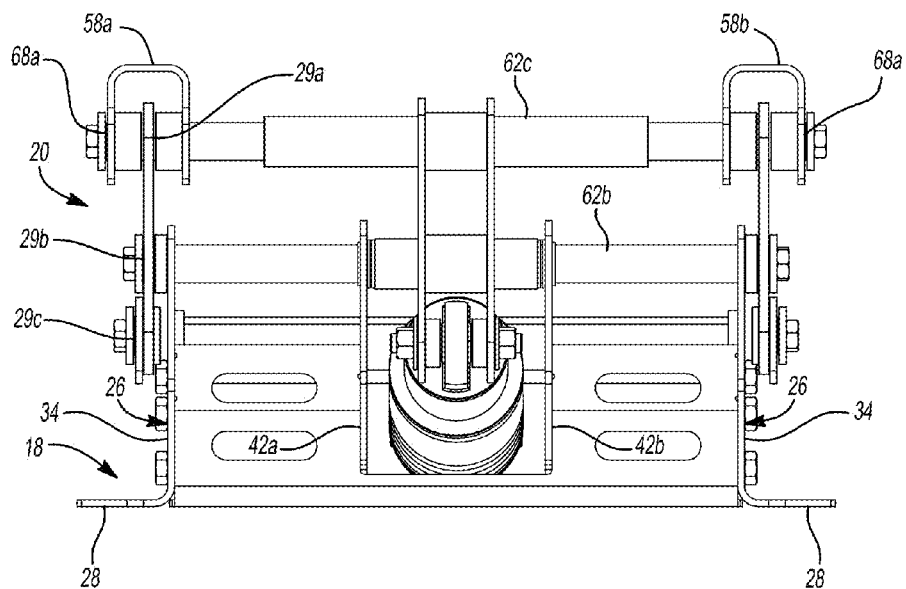
FIG. 10 is a front view of the support structure of FIG. 9, shown in the first configuration.

The first mounting feature 80 may be rotatably attached to the second mounting feature 64b of the return plate 56 for rotation about the seventh axis of rotation 75. The second mounting feature 82 may be rotatably attached to the first and second mounting features 50a, 50b of the second support bracket 32, for rotation about an eighth axis of rotation 81. As will be explained in more detail below, during operation of the seat assembly 10, the energy-management assembly 22 may provide a torque about the first, second, third, fourth, fifth, sixth, seventh, and eighth axes of rotation 63, 65, 67, 69, 71, 73, 75, 81, generally forcing the linkage assembly 20 from the second configuration (FIG. 13) to the first configuration (FIG. 6).

The adjustment assembly 24 may include a first track member 83 and a second track member 85. The first track member 83 may be attached to the first support member 58a. The second track member 85 may be attached to the second support member 58b. The first and second track members 83, 85 may allow a user to slide, or otherwise adjust the linear position of, the seat bottom 14 and the pan 23 relative to the linkage assembly 20 and the base 18.

With continued reference to FIG. 4, the pan 23 may include a first surface 84, a second surface 86, and a bracket member 90. Angular sidewalls 88 may extend between and connect the first surface 84 and the second surface 86, generally defining a cavity 89. The cavity 89 may receive a similarly-sized and similarly-shaped protruding portion (not shown) of the seat bottom 14, such that the second surface 86 and the angular sidewalls 88 are in contact with the protruding portion. The pan 23 and the protruding portion of the seat bottom 14 may be formed from an energy absorbing material such as, for example, a high-density viscous elastic polyurethane foam. In one configuration, the pan 23 and the protruding portion may be formed from two or more different types of foam to provide the pan 23 and the protruding portion with varying energy absorption characteristics. In addition, the first surface 84 of the pan 23 may be attached to, and generally support, the seat bottom 14. The bracket member 90 may include a plurality of attachment features 92 for attaching the pan 23 to respective slidable support brackets 87 of the first and second track members 83, 85. Accordingly, when the support brackets 87 are moved relative to the track members 83, 85, the pan 23 and the seat bottom 14 are likewise moved relative to the track members 83, 85.

As described, the first surface 84, the second surface 86, and the angular sidewalls 88 of the pan 23 may be covered by the protruding portion of the seat bottom, such that the surfaces 84, 86 and the sidewalls 88 are covered by foam. The foam may be a high-density viscous elastic polyurethane foam that is formulated to absorb and dampen a force transmitted therethrough.

Operation of the seat assembly 10 will now be described in more detail. With reference to FIGS. 4 and 5, the biasing member 72 of the energy-management assembly 22 may prevent rotation of the linkage assembly 20 about the first, second, third, fourth, fifth, sixth, seventh, and eighth axes of rotation 63, 65, 67, 69, 71, 73, 75, 81 when the seat assembly is in the first configuration (FIG. 6). Specifically, the biasing member 72 may produce a biasing torque about each aforementioned axis that is sufficient to maintain the seat assembly 10 in the first configuration during normal use and under normal driving conditions.

Figure 11:
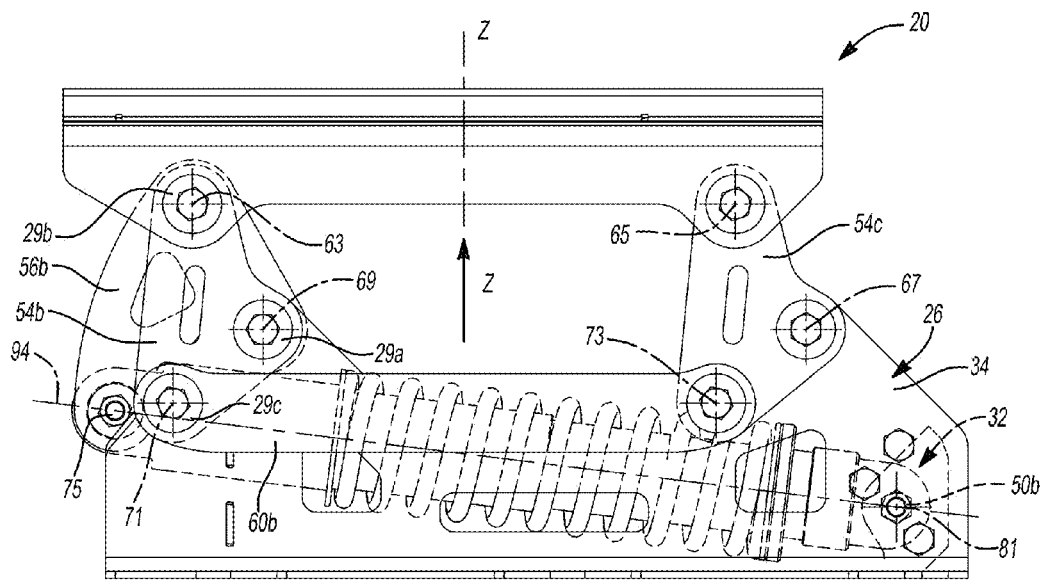
FIG. 11 is a side view of the support structure of FIG. 9, shown in the first configuration.
Figure 13:
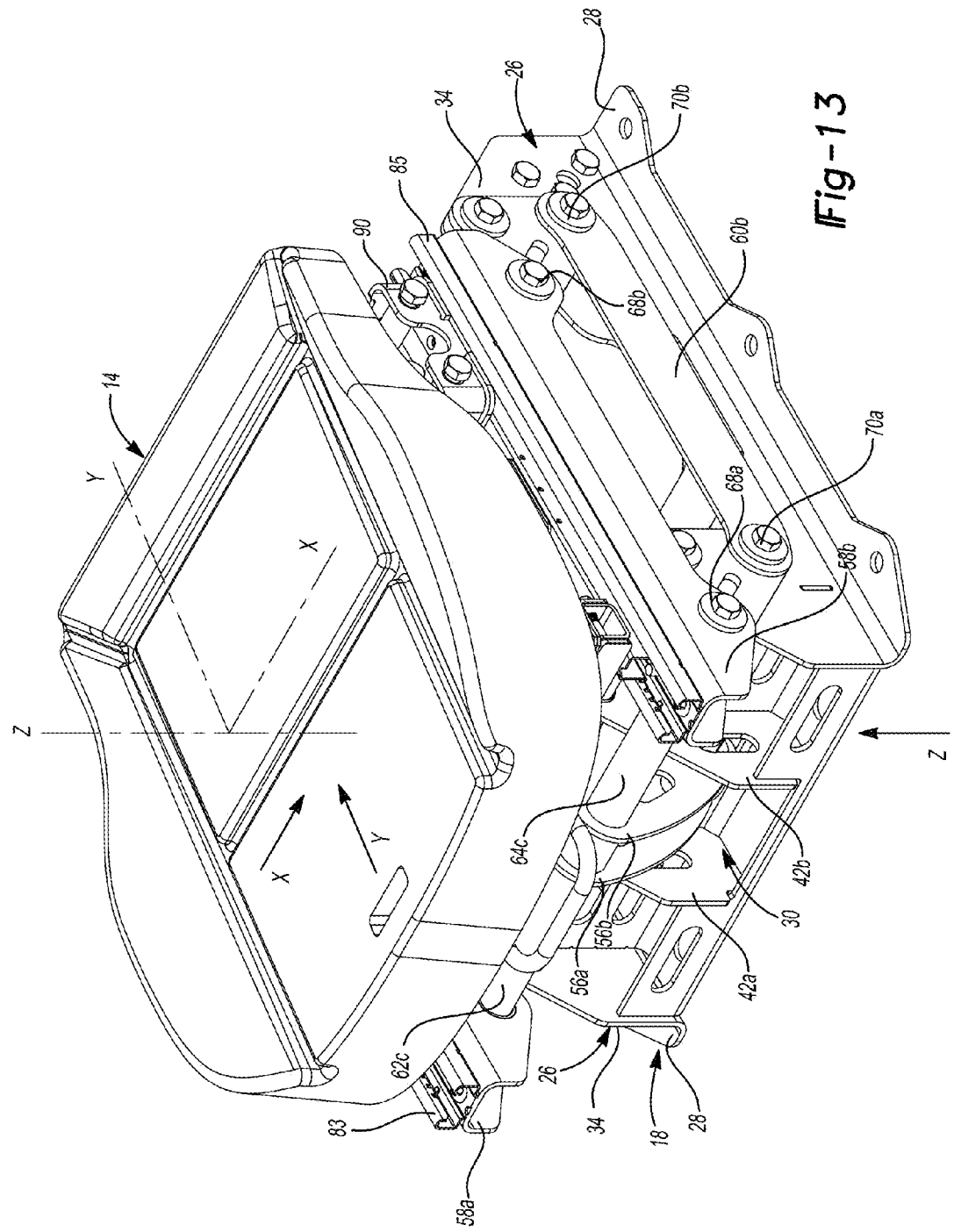
FIG. 13 is a perspective view of the portion of the seat assembly shown in FIG. 6, shown in a second configuration.
Figure 14:
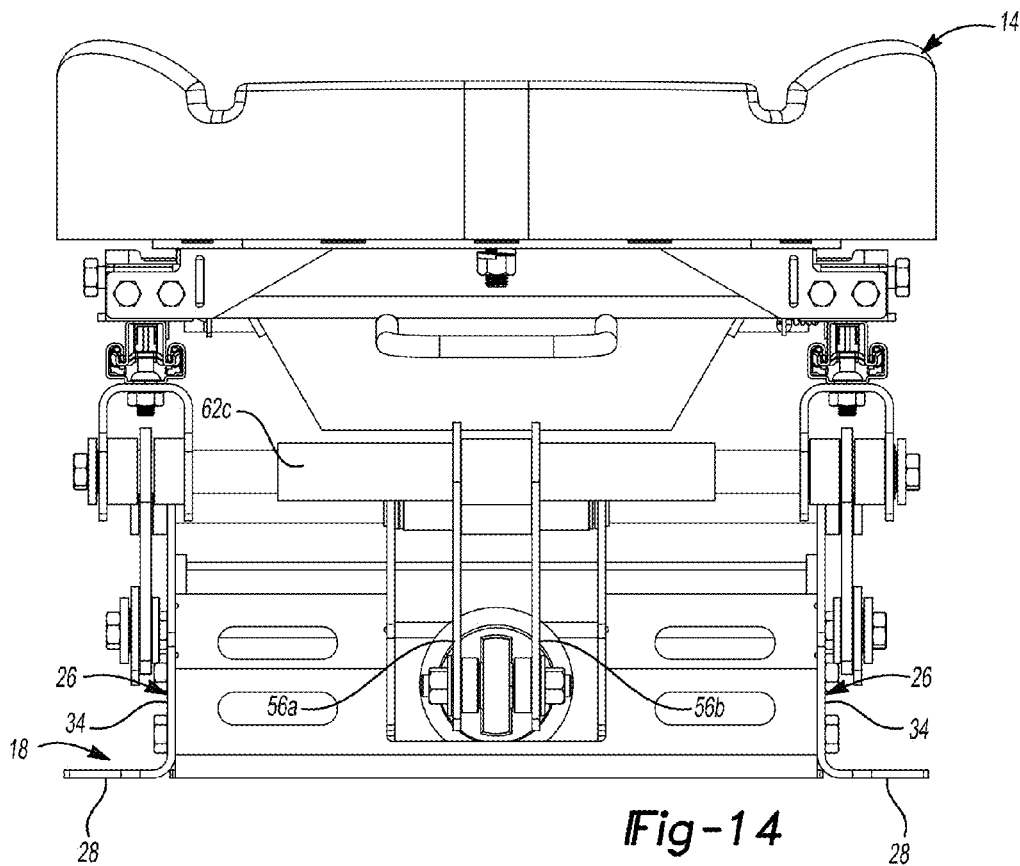
FIG. 14 is a front view of the portion of the seat assembly shown in FIG. 6, shown in the second configuration.
Figure 15:
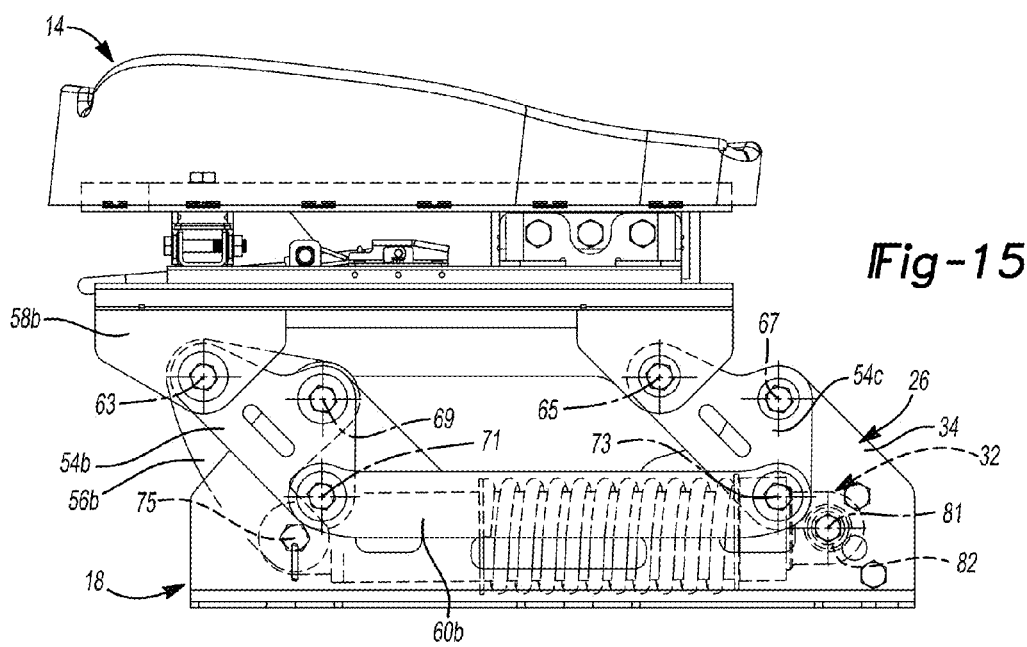
FIG. 15 is a side view of the portion of the seat assembly shown in FIG. 6, shown in the second configuration.
Figure 16:
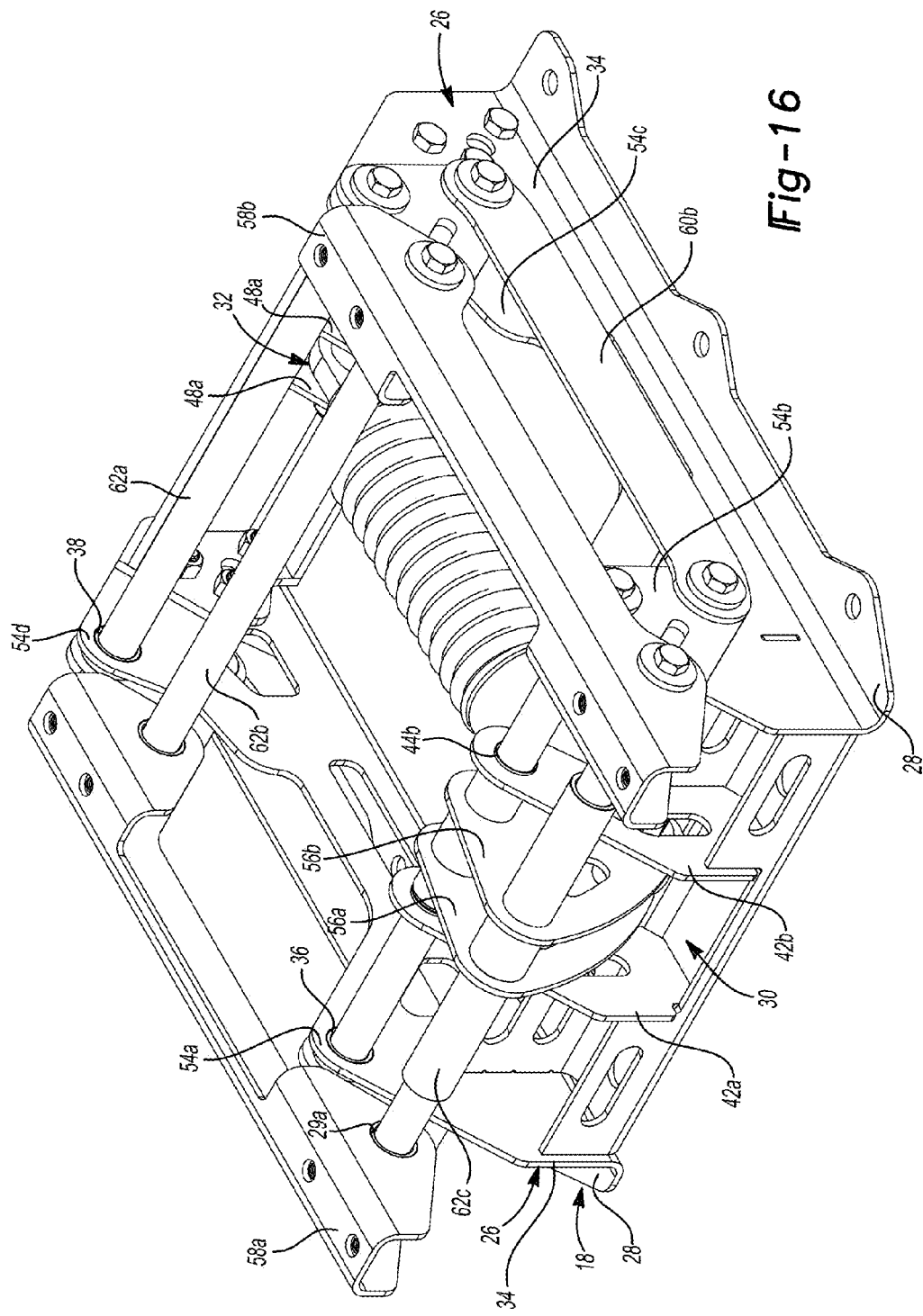
FIG. 16 is a perspective view of the support structure of the seat assembly of FIG. 1, shown in the second configuration.
Figure 17:
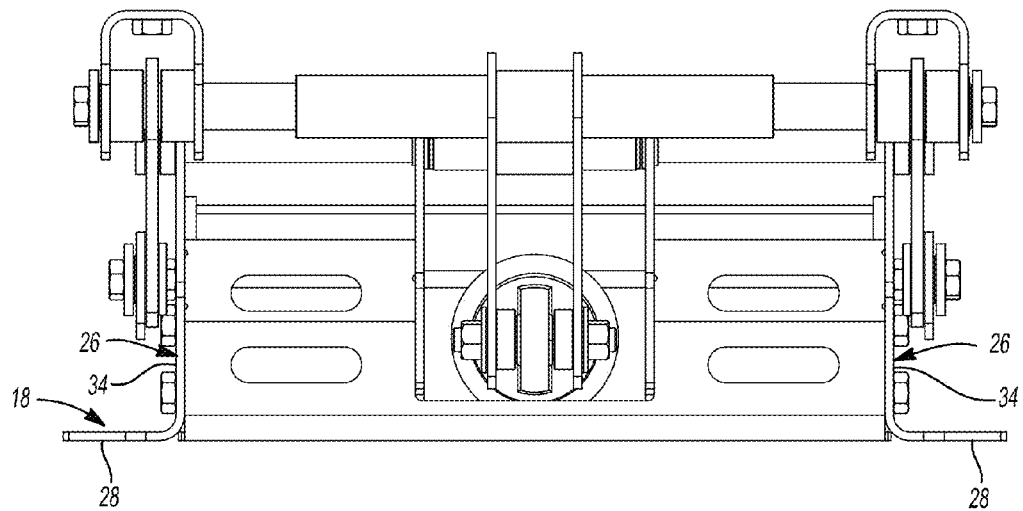
FIG. 17 is a front view of the support structure of FIG. 16, shown in the second configuration.

With reference to FIG. 13, when a sufficient force, such as that produced by an improvised explosive device (IED) or a collision, is applied to the seat assembly 10 in a vertically up or down direction (Z), or in a direction parallel to or along the Z-axis, the force may be transmitted through the linkage assembly 20 and the base 18. With reference to FIGS. 4 and 11, the force may produce a torque about the first, second, third, fourth, fifth, sixth, seventh, and eighth axes of rotation 63, 65, 67, 69, 71, 73, 75, 81 that is opposite to the biasing torque produced by the biasing member 72. If the event torque exceeds the biasing torque, the linkage assembly 20 and energy management assembly 22 may begin to rotate about the first, second, third, fourth, fifth, sixth, seventh, and eighth axes of rotation 63, 65, 67, 69, 71, 73, 75, 81, and the seat assembly 10 may assume the second configuration (FIG. 13). Specifically, as illustrated in FIG. 11, a force in the direction (Z) may include a force component that is parallel to a longitudinal axis 94 of the piston assembly 74. The force in the direction of the longitudinal axis 94 may exceed the corresponding and opposite force produced by the biasing member 72, thereby causing the inner cylinder 76 of the piston assembly 74 to move within the outer cylinder 78 of the piston assembly 74, thus compressing the damper mechanism. Accordingly, the first and second rocking members 54a, 54b and the first and second return plates 56a, 56b may rotate, with respect to the base 18, about the fourth axis of rotation 69. The piston assembly 74 may likewise rotate, with respect to the base 18, about the seventh and eighth axes of rotation 75, 81. The third and fourth rocking members 54c, 54d may rotate, with respect to the base 18, about the third axis of rotation 67. The first and second support members 58a, 58b may rotate, with respect to the rocking member 54, about the first and second axes of rotation, respectively. The first and second connecting plates 60a, 60b may rotate, with respect to the rocking member 54, about the fifth and sixth axes of rotation 71, 73, respectively.

Rotation of the linkage assembly 20, as described above, may prevent the first and second support members 58a, 58b and first and second connecting plates 60a, 60b from rotating with respect to the base. Accordingly, the seat bottom 14 may be prevented from rotating with respect to the base 18, and may follow a generally arcuate path from the first configuration to the second configuration.

If the force in the direction (Z) is withdrawn to the extent that the event torque is less than the biasing torque created by the biasing member 72, the biasing torque about the first, second, third, fourth, fifth, sixth, seventh, and eighth axes of rotation 63, 65, 67, 69, 71, 73, 75, 81 may be sufficient to rotate the linkage assembly 20 such that the seat assembly 10 assumes the first configuration (FIG. 6) in a manner opposite to that described above. Specifically, when the vehicle begins to move in a direction opposite and parallel to direction (Z), the seat bottom 14 moves away from the occupant, and the force applied on the seat bottom 14 by the occupant is withdrawn. The biasing force created by the biasing member 72 may cause the inner cylinder 76 of the piston assembly 74 to move within the outer cylinder 78 of the piston assembly 74, thus decompressing the damper mechanism, and rotating the linkage assembly 20 and the seat assembly 10 into the first configuration (FIG. 6). Accordingly, the energy-management assembly 22 may be reset in the first configuration, such that the assembly 22 can cushion the occupant by absorbing a force in the direction (Z) produced when the occupant returns to the seat bottom 14.

Figure 12:
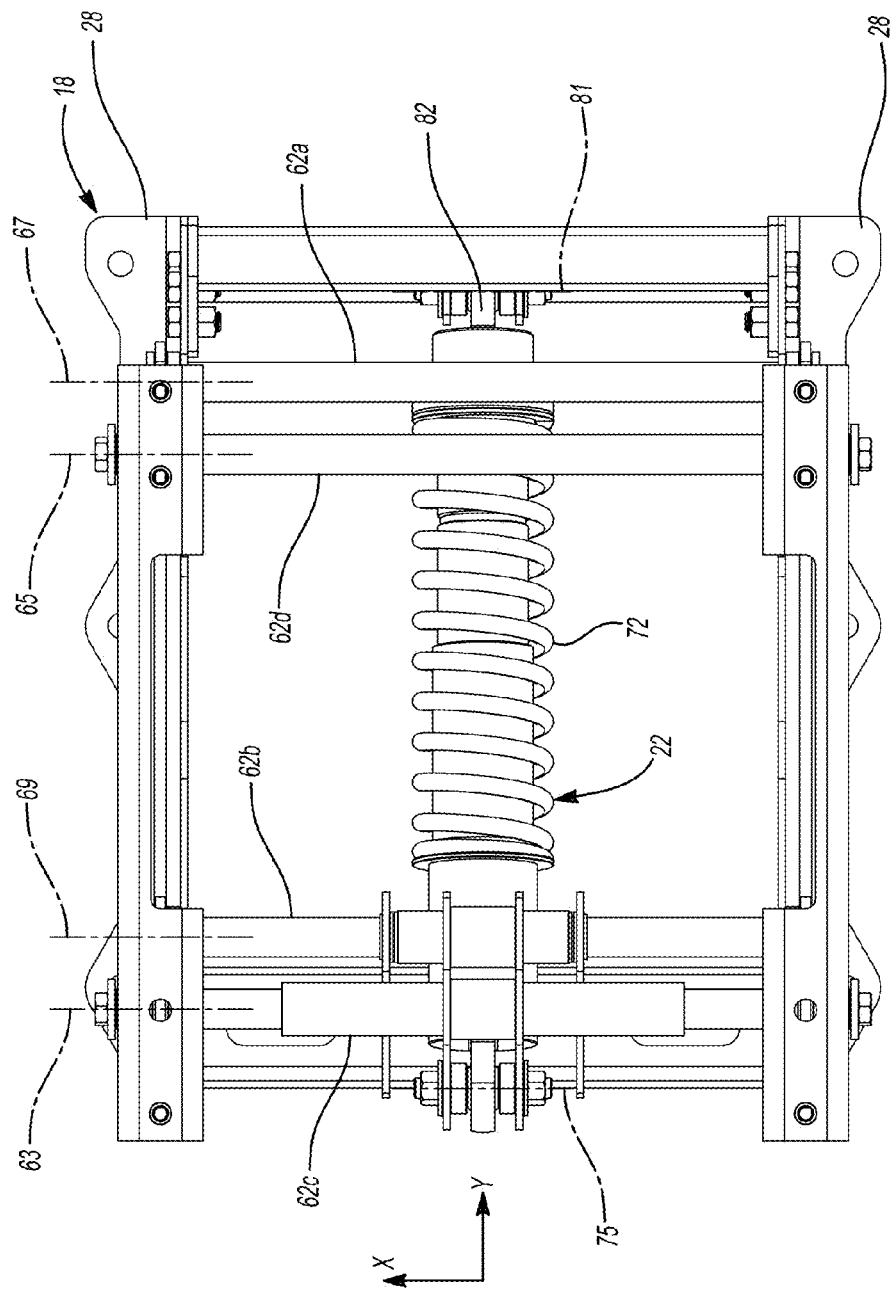
FIG. 12 is a bottom view of the support structure of FIG. 9, shown in the first configuration.

With reference to FIGS. 1 and 2, the seat assembly 10 may also include a seat belt system 96 having a shoulder strap 98, a lap strap 100, and a buckle 102. As illustrated, in some configurations, the seat belt system 96 may include two shoulder straps 98 and two lap straps 100. The shoulder straps 98 may extend through the seat back 12. In this regard, the seat back 12 may include apertures 104 through which the shoulder straps 98 extend. The shoulder straps 98 and the lap straps 100 can be coupled to the buckle 102 to secure the vehicle occupant to the seat back 12 and seat bottom 14. The seat belt system 96, which is an active system that is coupled with a sensor (not shown), operates to ratchet the vehicle occupant into a seating position in the seat assembly 10. In this regard, at least one seat belt retractor 106 is motorized with a sensor (not shown) that monitors at least one operational variable of the vehicle, including but not limited to speed or acceleration in the X, Y or Z directions (FIGS. 11-13), or in a direction otherwise parallel to at least one of the X, Y and/or Z axes. In response to a change in at least one of the operational variables, the sensor may activate one of the retractors 98 to pull the occupant into the seat assembly 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seat assembly comprising:
  a base;
  a linkage assembly supported by the base, the linkage assembly including a return plate supported by the base for rotation about a first axis of rotation;
  a seat supported by the linkage assembly for movement relative to the base along a generally arcuate path, the return plate operable to rotate relative to the seat about a second axis of rotation; and
  an energy-management assembly supported by the base for rotation about a third axis of rotation and supported by the return plate for rotation about a fourth axis of rotation, the energy-management assembly including a biasing member configured to resist the movement of the seat relative to the base along the generally arcuate path.

2. The seat assembly of claim 1, wherein the energy-management assembly is configured to resist rotation of the linkage assembly when the seat assembly is in a first configuration.

3. The seat assembly of claim 2, wherein the energy-management assembly is configured to produce a biasing torque about the first and second axes of rotation.

4. The seat assembly of claim 1, wherein the energy-management assembly includes a damper.

5. The seat assembly of claim 1, wherein the seat is operable to follow a generally arcuate path between a first configuration and a second configuration.

6. The seat assembly of claim 1, wherein the linkage assembly further comprises a first rocking member supported by the base for rotation about the first axis of rotation, the first rocking member further supported by the return plate for rotation about the second axis of rotation.

7. The seat assembly of claim 6, wherein the linkage assembly further comprises a second rocking member supported by the base for rotation about a fifth axis of rotation.

8. The seat assembly of claim 7, wherein the seat is operable to rotate relative to the second rocking member about a sixth axis of rotation.

9. The seat assembly of claim 1, further comprising:
  a seat back having a seat belt aperture; and
  a seat belt system including a strap member extending through the seat belt aperture.

* * * * *